United States Patent
Kahn et al.

(10) Patent No.: US 8,498,634 B2
(45) Date of Patent: Jul. 30, 2013

(54) AUTOMATED CALL BACK REQUEST FOR A MOBILE PHONE

(75) Inventors: Ari Kahn, Mt. Shasta, CA (US); Peter O. Roach, Jr., Atlanta, GA (US); Scott Fox, Del Mar, CA (US); Ellen M. Kirk, Del Mar, CA (US)

(73) Assignee: Starscriber Corporation, Scottsdale, AZ (US)

( * ) Notice: Subject to any disclaimer, the term of this patent is extended or adjusted under 35 U.S.C. 154(b) by 1125 days.

(21) Appl. No.: 12/176,301

(22) Filed: Jul. 18, 2008

(65) Prior Publication Data

US 2009/0023427 A1  Jan. 22, 2009

Related U.S. Application Data

(60) Provisional application No. 60/951,185, filed on Jul. 20, 2007.

(51) Int. Cl.
*H04W 4/00* (2009.01)
*H04W 68/00* (2009.01)

(52) U.S. Cl.
USPC ........................... 455/422.1; 455/458

(58) Field of Classification Search
USPC ........... 455/422.1, 458, 455, 518; 379/207.02
See application file for complete search history.

(56) References Cited

U.S. PATENT DOCUMENTS

| | | | |
|---|---|---|---|
| 5,463,382 A | 10/1995 | Nikas et al. | |
| 5,566,236 A | 10/1996 | MeLampy et al. | |
| 5,727,057 A | 3/1998 | Emery et al. | |
| 6,064,874 A | 5/2000 | Cox et al. | |
| 6,442,257 B1 | 8/2002 | Gundlach | |
| 6,581,166 B1 | 6/2003 | Hirst et al. | |
| 6,934,529 B2 | 8/2005 | Bagoren et al. | |
| 2003/0231753 A1* | 12/2003 | Casaccia | 379/207.02 |
| 2004/0082348 A1 | 4/2004 | Gabriel et al. | |

FOREIGN PATENT DOCUMENTS

| | | | |
|---|---|---|---|
| WO | WO 2004/100521 A1 | 11/2004 | |
| WO | WO 2004/107795 | * | 12/2004 |
| WO | WO 2004/107795 A1 | 12/2004 | |
| WO | WO 2005/006725 A1 | 1/2005 | |
| WO | WO 2007/141762 | * | 12/2007 |
| WO | WO 2007/141762 A1 | 12/2007 | |

* cited by examiner

*Primary Examiner* — Michael Faragalla
(74) *Attorney, Agent, or Firm* — Woodcock Washburn LLP

(57) ABSTRACT

Methods and apparatus for providing automated call back requests are provided. In one method a signaling link in a telecommunications system is monitored for a transaction including a connection request containing a called address followed by a disconnection request within a first predetermined time period. Responsive to the transaction, the method determines if a trigger condition exists, and if so, communicates a call back request to a called party through a separate network.

20 Claims, 7 Drawing Sheets

AUTOMATED CALL BACK REQUEST FOR A MOBILE PHONE

CROSS-REFERENCE

This application claims the benefit under 35 U.S.C. §119 of U.S. Provisional Application No. 60/951,185, titled "Automated Call Back Request for a Mobile Phone," filed Jul. 20, 2007, which is incorporated by reference herein in its entirety.

TECHNICAL FIELD

The present invention relates generally to wireless networks.

BACKGROUND OF THE INVENTION

Currently a large percentage of the population own and use a mobile communication device including those selected from the group of classic cellular telephones, personal digital assistants, Blackberrys, voice over Internet Protocol (VOIP) devices, or other wirelessly connected communications devices for coupling a subscriber (hereafter referred to as a mobile subscriber) to a communication system. In many locations a "calling party pays" system is implemented. The calling party pays system requires the party establishing the communications to pay for the call. For example, as one would expect in these types of systems, a mobile subscriber that initiates a call to another mobile subscriber will be billed for initiating the call (e.g., based on the duration of the call, the location of the recipient, etc.) In some systems, both the calling party and the called party are charged for the communication. Additionally, some systems charge premiums for initiating communications with certain recipients, based for example on the nature of the communication network or characteristics of the recipient. For example, in one such system if a landline caller makes a call to a mobile subscriber on a premium network, the landline caller may be required to pay a premium rate to reach the mobile subscriber.

In the calling party pays environment, a mobile subscriber may not wish to pay the expense of the phone call or the added expense associated with calling another party on a premium network. In this type of billing environment, in order to prompt a call from and shift the cost to another party who the subscriber desires to communicate with, the subscriber can initiate a call to the intended party and when the call begins alerting (ringing) the originator of the call can hang up (the practice is sometimes referred to as "pinging"). This causes the phone of the dialed party to receive a missed call alert indicating the first party is attempting to contact the second party. This type of messaging can be intended to prompt the second party to then establish a second phone call back to the first party thus shifting the cost of communications to the second party. Reasons for this behavior can include that the first party is not on a premium network (landline) while the second party is on a premium network (mobile) and the practice allows the overall cost of the call to be lower since the call is not directed at a premium network. In a calling party pays environment, users also may wish to convey information with this type of signaling. The two parties may predetermine the meaning of a message, such as, 'I have left work', 'I have arrived home' or some other prearranged message. This enables users to establish communications without paying for a call or message. In essence this type of behavior leverages on the billing rules of a calling party pays network, and more specifically on the non billable event related to disconnecting the call before the destination answers, to be able to communicate end to end without the incurring cost.

The behavior of calling a number and hanging up before the billing event to send the originating party's number is commonly referred to as "Pinging" or "Callback." It has been used through out the industry for many years in local networks or across long distance networks. One common use for this pinging is to bypass the cost of long distance from the local network and shift the cost to a second network or location. For example, a user in a high cost network will place a call to a number in a different country. Upon hearing the called number begin to ring, the user hangs up. This triggers the platform associated with the called number to place a call to the originating number. After this connection is setup between the originating party and the platform, the user inputs the final destination number of the call. The platform then places a second outbound call to the destination number and bridges the two calls together. Oftentimes both calls from the platform are less expensive than originating a call from the local network.

Individual users have found this functionality useful in avoiding both long distance and local charges. Users have also found this functionality useful in allowing quick communications between two users to trigger prearranged events or activities. Significantly given the "peer to peer" nature of cellular there is no need to enter any additional addressing information as the number originally dialed represents the "final destination."

The problem with this functionality is network resources are utilized to setup the end-to-end ping message without compensating the network provider. Oftentimes the network resources needed to setup these types of ping messages are substantial. The call setup message consumes dedicated spectrum over the air interface, typically reserves actual voice channels on a mobile network, allocates a path through the local system, allocates voice channels between (or on intervening) networks, allocates a path through the system, and a reserves a voice channel on the called system. All of these facilities are setup and then torn down without a billable event occurring on any of the networks. Many times this pinging activity can account for a significant portion of traffic on a network and thus is very disruptive or costly for the mobile operator.

What is required is a method and apparatus that allows a mobile subscriber to rapidly send a ping message to a second user in an easy to understand method while allowing the mobile network to easily handle and route these type of messages. This method and apparatus should allow the user to continue to use the ping setup method similar to the one they have become accustom to using; e.g., on a mobile network the user dials the number, hits send, waits until they hear ringing, and hits end and it should reuse as much of the functionality in the existing mobile network as possible.

A service offering capable of offering an automated ping service is described in PCT applications WO 2005/006725, WO 2004/107795, WO 2004/100521 and PCT/IB2007/052163, incorporated herein by reference. The methods, systems, computer program products and apparatus disclosed in this present application expand the prior art to generally improve the acceptability of the automated ping services for both users and carriers.

SUMMARY OF THE INVENTION

Systems, apparatus, computer program products and methods are provided for easily and seamlessly communicating a ping request from a calling party to a called party. In one implementation, when a prepaid customer attempts to place a call, a probe in the network will monitor the messages between the MSC and the prepaid SCP to determine if a trigger situation exists. Triggers for the service can include:

Call setup attempt abandoned by calling party before call set up is complete

Call setup attempts of predetermined duration can be considered a trigger event

Zero funds available (immediate disconnect from prepaid system or rerouting the call to a recharge mechanism)

Calls with short alerting period and very short call duration (unintentional call connects)

Other triggers are possible

In one particular implementation, the network probe is configured to look for an event where the mobile user has dialed a number and hit the send and end button very rapidly or a situation where the mobile user has attempted to place a call without sufficient credit in their prepaid account. If a trigger event occurs, the probe will allow all normal (e.g., prepaid) messaging to proceed and should not have an impact on the proper operation of the cellular operator's (e.g., prepaid) service.

On encountering a trigger, the probe will then determine if the called party is a known party (e.g., is a known mobile subscriber). If the called party is known, a (e.g., short) message will be sent to the called party indicating the calling party has requested a call back (e.g., the message can include the call back number of the calling party and/or can appear as if it originated from the calling party thus triggering any phonebook interactions and displaying the calling party's name in association with this message)). Alternatively or in addition if the called party is determined to be a landline phone, the system will attempt to set up a call to the landline without a final voice connection. The object of this call setup will be to present caller line identity (CLID) via a missed call alert on the destination phone.

Upon successful delivery of the message to the called party, the probe may then send a message (e.g., SMS) to the calling mobile indicating a ping message requesting a callback has been successfully delivered to the called party. Alternatively as SMS is "guaranteed" (e.g., using store and forward capability), the system may simply notify the calling mobile only on failure to deliver the callback request for whatever reason as this would be by far the exception to the successful delivery rule.

If successful, the service will allow a subscriber with no credit to prompt a billable call from the party they wish to connect with. This will enable mobile subscribers with little or no funds available to make a request for a reverse call connection and thus reversing the direction and billing of the call origination attempt.

The system is configured to recognize a trigger event that triggers a ping to the called party. There are several different methods for the mobile system to recognize a trigger event. One illustrative method of recognizing a trigger event (e.g., message) is to place a probe or monitor device in the signaling network of the mobile operator to capture events indicating the calling party's desire to send a ping message. The system can recognize the following conditions as a trigger event:

Call setup abandon by the calling party trigger—This trigger condition is encountered if the call setup is abandoned (canceled) by the calling party before answer supervision is received and the call setup timer (CST) has not expired. The CST is designed to allow the application to recognize a short abandoned period (typically under a few seconds) from a ring-no-answer condition where the mobile user was attempting to contact the called party directly. If this condition exists the system can treat this event as a subscriber abandon trigger.

Zero funds available trigger—This trigger event is captured by monitoring the link in order to determine if the call attempt has been disallowed for lack of funds. If this condition exists the system should treat this event as a zero funds trigger.

Extremely short call trigger—This trigger event is captured by monitoring the link for an extremely short call duration condition (Including the call set up time). If this condition exists the system can treat it as short call trigger.

In another aspect, the system is configured to issue a ping to the called party. One method to perform this function is to have a ping application screen the trigger event to determine if the ping message should be sent to the called party.

The ping application can be capable of disallowing certain dialing codes from activating a request for call back; e.g., international long distance or premium numbers. For easy reference these numbers can be stored on a prohibited (e.g., black) dialing list. If the ping application determines the called number is on the prohibited dialing list, the application can block or modify the ping attempt. The ping application can then, dependant or configuration, send a message to the calling party indicating the ping has been rejected by the network. Text for this message can be dynamic in nature and may change depending on the called number. This text can be used to assist in explaining to the calling party why the attempt failed. If a call back request is disallowed, the application can send an error message to the calling party indicating the message was not sent. An example of the text of this message can be:

"You may not send a call back request to 1-900-123-4567 because this is a premium number."

In this example the "1-900-123-4567" is the number originally dialed by the calling party and the text "because this is a premium number" could be stored in the system for any number beginning with 1900.

In one implementation, if ping application determines a valid trigger event has been received, the ping application can collect the called party number as well as the calling party number. The application can check to see if the called party is a mobile phone, a phone capable of receiving a short message, or a standard landline phone incapable of receiving short messages or data messages. In one implementation, a look up of the dialed number on an associated table listing the landline, mobile, internet protocol, WiFi, WiMax, or other types of numbers (number type table) can be performed. A database of numbers can be internal to the ping application, associated with the ping application, or can be an external database such as a number portability database.

In some implementations, if the lookup of the called party on the number type table indicates the called party is a mobile number (or not on a blacklist) or a number capable of receiving a short message, the ping application can attempt to send a short message to the called party. In one implementation the short message originates from the application as if the application was acting as the short message service center. The application can alter the header of the short message to make it appear as if it originated from the calling party (if the calling party's number is placed in the header of the message this should enable the proper functioning of the phone book on the mobile phone to display the text stored on the mobile phone associated with this number). In some implementations, the ping application can then optionally mark this message to replace earlier such messages from the same sender. Alternatively the message protocol may be set to immediately display on the mobile handset ("Class zero sms"). In one implementation of this service the text used for constructing a message can be stored on an associated table and indexed by called number.

In some implementations, the probe is configured to detect a call attempt that may have triggered a traditional missed call alert on the called party phone. The probe can then be programmed to send a training message to the calling party. The intent of the training message can be to inform the calling party that they could have performed the similar functionality by shorting the call set up hold time or to inform the calling party of other benefits of utilizing a message based call me service versus leaving a missed call alert In some implementations, a training message can be programmed to be sent if the probe detected that the call set up message resulted in a call connection. If the probe detected the call connection was maintained for only a short period of time, the training message could be configured to inform the calling party that by using the messaging based call me service in place of leaving a missed call alert the calling party may not risk the chance of a call connection and the associated billing.

In another aspect, a system is provided that signals the calling party if the called party is not currently available on the network. The system can be programmed with different options. Two example options are:

Option 1—A data message can be sent to the calling party indicating the called party did not receive the request for a callback. ("try again later")

Option 2—A flag can be set in the home subscriber database (HLR) to indicate a data message is waiting delivery. When the called party's communications equipment registers with the network, the data message can then be sent to the called party's phone. If this option occurs, a message can then be sent to the calling party indicating that the message has been stored for future delivery. If further messages are received from the same calling party to the same called party before the original message was delivered, the system can increment a counter on the message instead of accumulating further similar messages for delivery.

In another aspect, the messages sent to either the called party and or the calling party can be alternatively marked for immediate display on the mobile subscriber equipment or placed in the normal queue for these types of message. If the message was marked for immediate display, the system can enable the message to be automatically displayed without requiring the user to perform complex operations, such as, opening a message box, logging onto a data network, or navigating multiple menus to view the message. The message can also it be marked to be replaced by other messages received from the same address for the same service. In this manner, only the latest message can be displayed or a counter can be incremented to indicate how many messages were attempted. This will allow the called party to easily view the pertinent information without having to sort through multiple messages.

In another aspect, if the called party number is a landline phone or not capable of receiving data messaging, the system can include an alert mechanism to this type of called party to begin the process of setting up a call using a standard call set up signaling such as ISDN User Part (ISUP) signaling. Using this signaling the system can place an ISUP call attempt to the called party number. The system can monitor this link for any type of call forwarding or call connection and treat them appropriately (tear down the call attempt). Since the intent of this ISUP call attempt is to alert the called party to a ping attempt by providing the calling line ID (and possibly calling name) of the calling party, a call that is forwarded may not deposit the calling line ID and should not be progressed. Also, a call that is answered will cause a billing event and at the point of answer, the calling line ID or calling name ID transmission typically terminates. Since establishing and holding a connection is not the purpose of this messaging attempt, the connection can be rejected or terminated as quickly as possible in the calling party network. If the call attempt is made to deliver the missed call alert and the alerting message is received on the signaling network from the called party connection, the system can initiate a timer. The purpose of this timer is to allow the calling line ID and possibly the calling name ID to be sent to the called party's communications equipment (this typically occurs between the first and second ring for a typical landline POTS call (plain old telephone service). Once this timer has expired the system can then tear down the call attempt.

In yet another aspect, the system can alert the calling party that the ping message has been successfully delivered to the called party. If the ping alert message is successfully delivered to the called party, the system can then format and send a data message to the calling party indicating the successful delivery of the callback request. This message can be of the form of a short message, Unstructured Supplementary Service Data (USSD) message, Enhanced Data GSM Environment (EDGE), Universal Mobile Telecommunications Service (UMTS), internet protocol (IP) message, or other similar type of data message. The message can alert the calling party to the delivery, failure, storage, or other state of the ping message to the called party.

In yet another aspect the system provisions a link server or a ping server to act as the short message service center (SMSC) for the ping messages without utilizing the SMSC in the mobile network. In this manner the link server or ping server acting as the SMSC can deliver the message directly to the calling or called party without placing a burden on the normal SMSC. This architecture also can allow the short messages from a ping to avoid normal billing procedures implemented for standard short messages sent from the SMSC normally used by the mobile subscriber. By acting as the SMSC and interfacing directly with the signaling network, such as signaling system number 7 (SS7), the messages can be marked as if they originated from the calling party, can be non-billable, and can be marked for immediate delivery.

In yet another aspect, the system can screen both calling and called numbers to determine if a ping message should be sent (Black List). This list can be used to screen potential abusive behavior by either the calling or called party. The black list can have entries only for calling parties, only for called parties, or for some combination of calling and called parties. Before sending a ping message to the called party the system can check the black list. The black list can be configured to contain wild card digits to indicate ranges of numbers. For example 67######## would be any number beginning with 67 that was 10 digits long or 67* would mean any number starting with 67 regardless of the length. These wild card digits can be used in either the calling or called numbers. If a number combination matches the black list, the system (e.g., the ping server) can block the attempt and send a message to the calling party indicating that the ping attempt failed. The black list can be modified to provide unique text associated with each one of the entries. In this manner a customized message can be provided for each black list entry.

In yet another aspect, the system can be configured to place a delay before sending the ping message to the called party. This delay can be used to reduce the usefulness of the ping service for providing international callback or other services of this nature. The message delay could be variable by number or number range and can use the wild card scheme outlined above when programming.

A still further aspect provides abnormal behavior alarms in the system (e.g., to assist in discovering and preventing abusive behavior on the network; e.g., excessive pings, harassment, calling fraud, etc). An alarm condition can be triggered when calling party number or a called party number appears above an established threshold within a predetermined period of time. The system can then issue an alarm to alert a system operator that an abusive behavior potentially existed. The operator or the system can then research and prevent the abusive behavior rapidly. In some implementations, the system can be configured to automatically respond and change the black list parameters to deal with potential abusive behavior.

Additional aspects, features, and advantages of the invention will become apparent to those skilled in the art upon consideration of the following detailed description of illustrated embodiments exemplifying the best mode of carrying out the invention as presently perceived.

DETAILED DESCRIPTION

Figure 1:
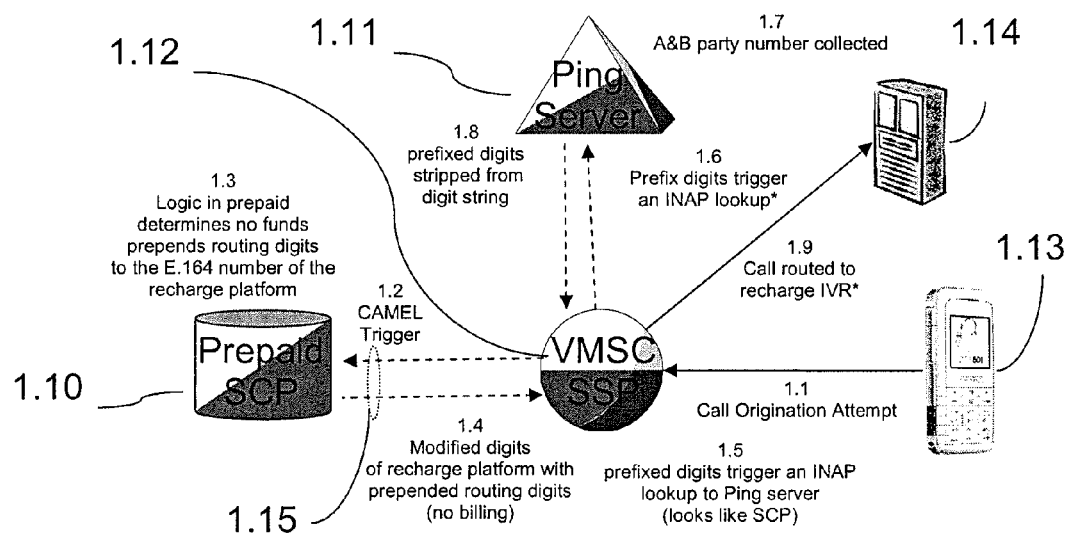
FIG. 1 is an illustration of an example system that uses INAP Triggered by Prepaid to provide a trigger message.

Turning now to the drawing set, FIG. 1 is an illustration of an example system having the capability of being triggered by an Intelligent Network Application Part (INAP) trigger. INAP is an IN (Intelligent Network) protocol used in a signaling system number 7 (SS7) network to query databases for a variety of functions not related to call setup and tear down. A typical example of the use of INAP in the network is to look up the actual routing number for a toll free number that is dialed on the network. On a call 1.1 placed by a user 1.13 the visited mobile switching center (VMSC) 1.12 would typically, in a Global System for Mobile Communications (GSM) system, encounter a Customized Applications for Mobile networks Enhanced Logic (CAMEL) trigger 1.2 indicating the calling party should be routed to a prepaid service control point (SCP) 1.10. If the prepaid SCP 1.10 determines there are no funds available step 1.3 it then prepends a specified digit string to the normal routing instructions to send the call to the recharge platform 1.14. This prepended digit string triggers an INAP trigger 1.6 in the network. This INAP trigger 1.6 is routed to the ping server 1.11 (or intermediate network elements that would continue the message to the ping server 1.11). The ping server 1.11 strips out the prepended number step 1.8, and collect the calling (A) and the called (B) numbers step 1.7. The message without the prepended digits can be routed back to the network instructing the call to be routed to the prepaid recharge platform 1.14.

In some implementations, an INAP trigger for all routing numbers going to the prepaid recharge platform 1.14 can be used without prepending a digit string. The INAP trigger can be activated for the address of the recharge platform 1.1.4 (telephone number) and cause the system to send a message to the ping server 1.11. The ping server 1.11 then returns the same number to the network and the call would be flagged as already encountered the INAP trigger. The call then is routed as normal. This would allow the ping server 1.11 to capture the A&B numbers without the need for special prepended numbers.

Figure 2:
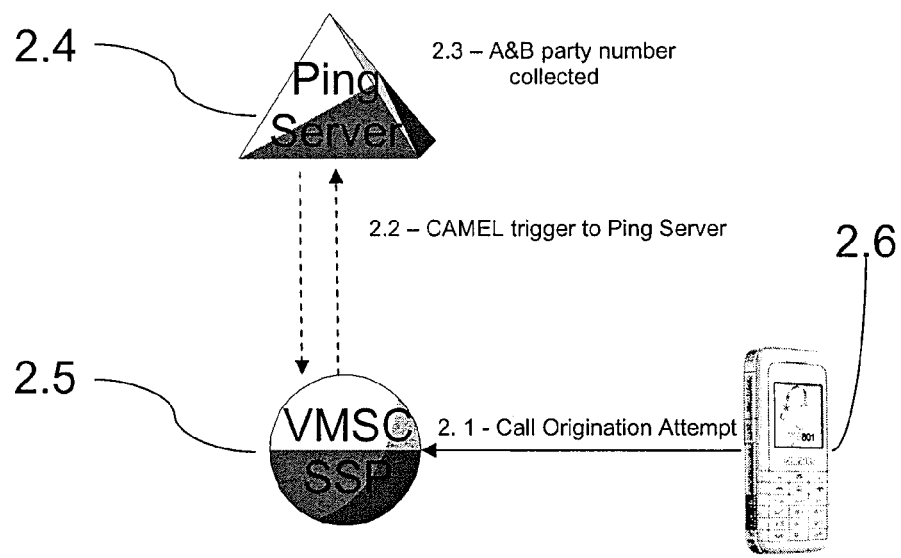
FIG. 2 is an illustration of an example system that allows for a ping only user.

Turning now to FIG. 2, this is an illustration of an example system providing for a special class of ping only subscribers 2.6. In this system, the home location register 2.5 can provide a special class of service for customers that could only ping 2.6. When placing an outbound call 2.1 customers 2.6 with this special class of service encounter a CAMEL trigger in the VMSC 2.5 that signal 2.2 the ping server 2.4. The ping server collects the A&B numbers 2.3 and signals the network to release the call. The ping server sends the call back request message to the called party. Alternatively the network can hold the call while sending the call back request message and, if the message was successful, the ping server can instruct the network to play a message to the calling party indicating the ping was received.

Figure 3:
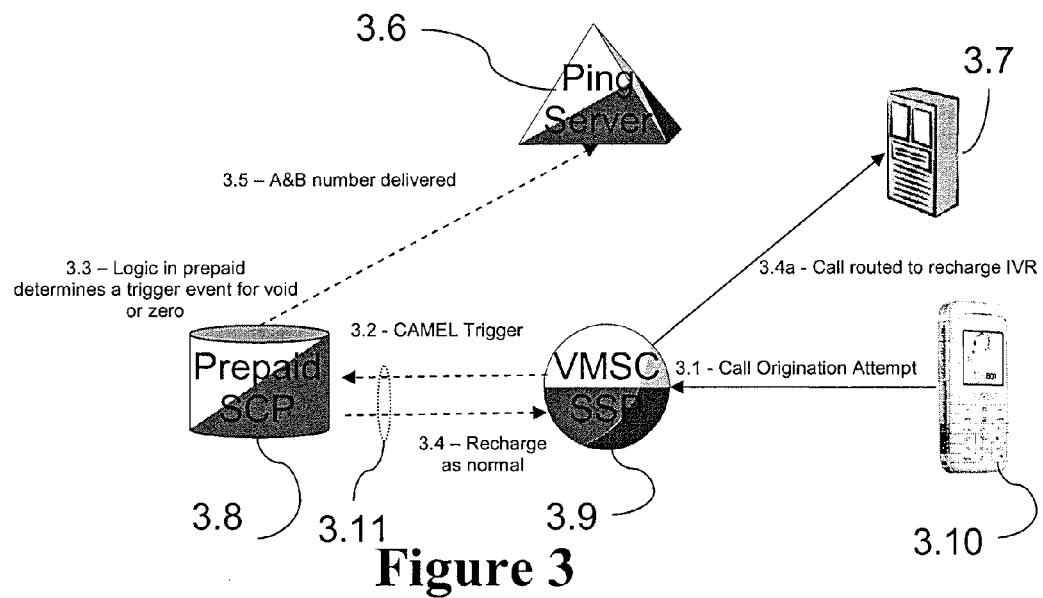
FIG. 3 is an illustration of an example system that has modified the existing prepaid system to recognize ping events.

Turning now to FIG. 3, this is an illustration of a conventional CAMEL based prepaid system 3.8 that has been modified to recognize a trigger event and send the trigger event message to a ping server 3.6. The process starts with a user 3.10 attempting to make a call 3.1. The call attempt 3.1 is received by the VMSC 3.9. VMSC 3.9 invokes a CAMEL trigger 3.2 for this user 3.10. The CAMEL trigger 3.2 is sent to the existing prepaid SCP 3.8 that has been specially modified to recognize a ping trigger event 3.3 as disclosed herein. Once the prepaid SCP 3.8 recognizes the ping trigger event 3.3, it sends a message 3.5 to the ping server 3.6. The ping server 3.6 functionality can be located on a separate network element or alternatively can be incorporated into the prepaid SCP logic. The major benefit of the architecture illustrated in FIG. 3 is the prepaid SCP 3.8 continues to be in charge of handling the logic of treating this call. For example the prepaid SCP 3.8 can instruct the VMSC 3.9 to route 3.4, 3.4a the subscriber 3.10 to a recharge platform 3.7. This architecture allows interactions between the prepaid SCP 3.8 and the recharge platform 3.7 to continue as normal while still activating a ping trigger 3.3 in the prepaid SCP 3.8.

Figure 4:
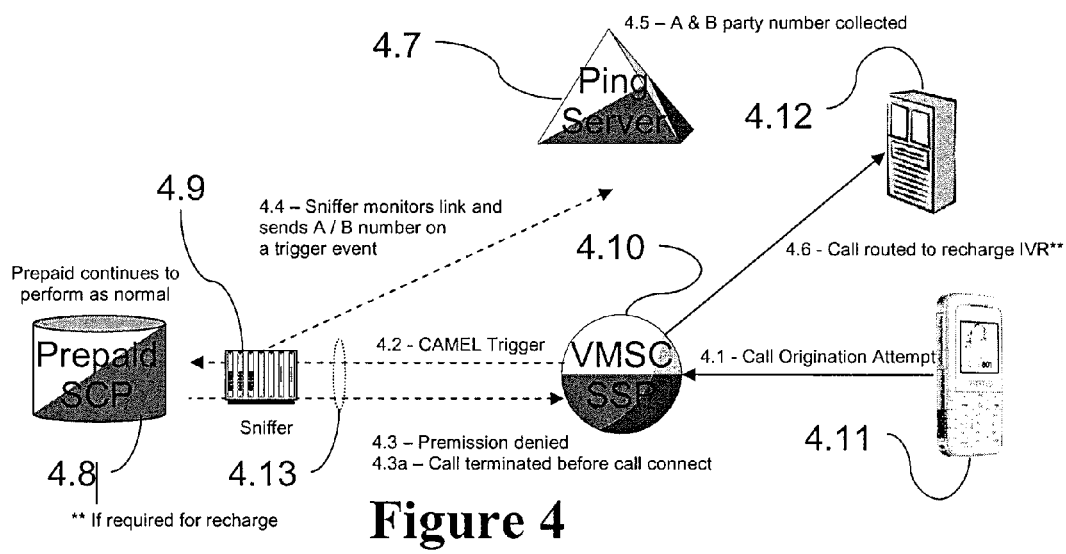
FIG. 4 is an illustration of an example system that places a monitor device between the visited mobile switching system (VMSC) and the prepaid service control point (SCP).

Turning now to FIG. 4, this is an illustration of an example system having the capability of monitoring the link 4.13 to the prepaid system in order to determine if a trigger event has occurred. In this architecture, the user 4.11 originates a call attempt 4.1 to the visited mobile switching center 4.10 triggering a CAMEL message 4.2 to the prepaid SCP 4.8. In order to capture the message stream associated with 4.2 and determine if the system should trigger a ping message, a monitor device 4.9 is placed to capture messages from the signaling link 4.13. If this monitor device 4.9 determines a trigger condition exists, it will send a ping trigger message 4.4 to the ping server 4.7 and the A and B (calling and called) numbers will be collected 4.5. In some implementations, the link monitor 4.9 and the ping server 4.7 can be incorporated into the same physical device to perform both functions or can be physical different devices performing the individual functions. This architecture has the benefit of allowing the prepaid SCP 4.8 to continue to treat the call as normal 4.3 or 4.3a. The prepaid SCP 4.8 can route the call 4.6 to a prepaid recharge platform 4.12 or it may decide to rapidly tear the call down 4.3a to conserve resources in the network.

Figure 5:
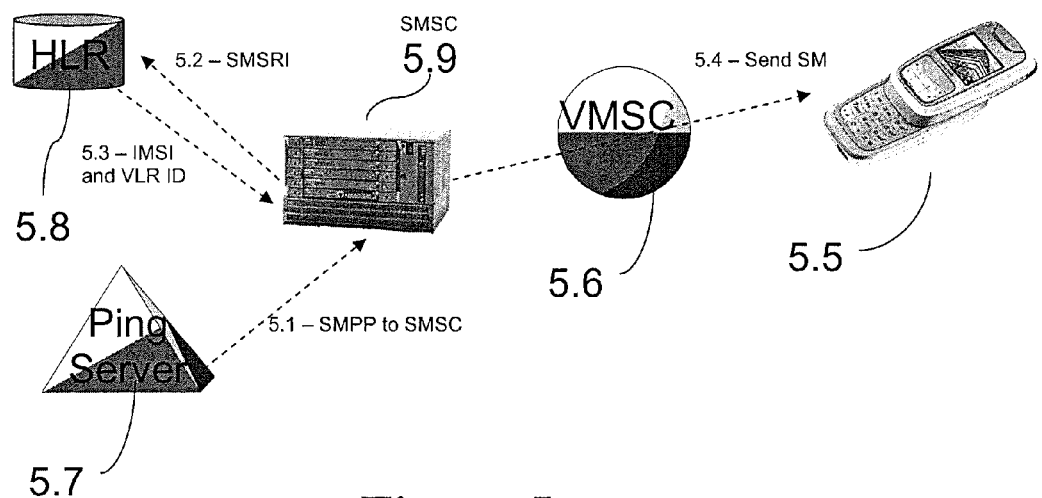
FIG. 5 is an illustration of an example system that allows delivery of the ping message through the existing SMSC.

Turning now to FIG. 5, this is an illustration of an example system having the capability of issuing a ping message to the called party 5.5 through an existing short message service center 5.9. This sequence is begun when the ping server 5.7 determines it has received a valid ping message. In this illustrative architecture the ping server sends a ping message 5.1 to a short message service center (SMSC) 5.9. The SMSC 5.9 sends the necessary location message 5.2 to the home location register (HLR) 5.8. The HLR 5.8 responds with the number to locate the user 5.3 and the SMSC 5.9 then sends a ping message 5.4 through the visited MSC 5.6 to the called party 5.5.

Figure 6:
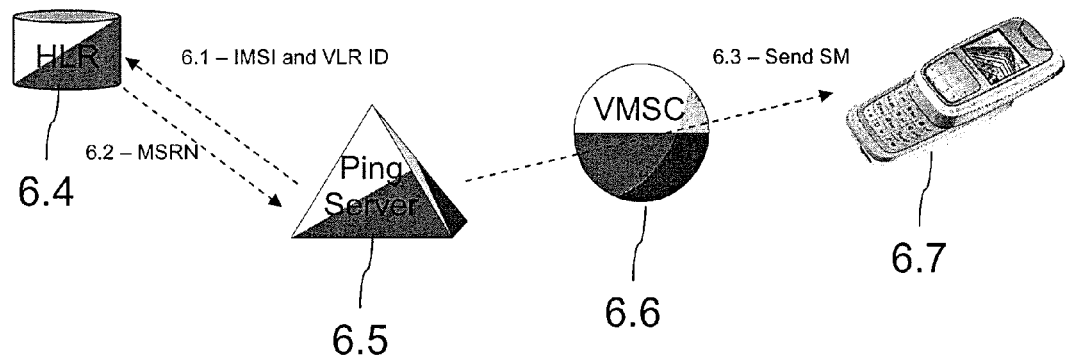
FIG. 6 is an illustration of an example system that allows the ping to be delivered directly onto the signaling network.

Turning now to FIG. 6, this is an illustration of an example system having the capability of issuing a ping message to the called party 6.7 using a direct interconnection to the signaling network. This sequence is begun when the ping server 6.5 determines it has received a valid ping message. It performs the location of the called party 6.7 directly with the home location register 6.4 by sending out a location request 6.2 to the HLR 6.4. The ping server 6.5 then receives a message indicating the routing information for sending a message to the called party 6.1. The ping server 6.5 sends a message 6.3 to the called party 6.7 through the current network 6.6. The ping server 6.5 receives a message indicating that the transaction 6.3 had been a success. This direct connect architecture has the advantage of allowing the ping server 6.5 to have access to all of the messaging off of the network. The ping server 6.5 can be programmed to supply failure messages to the calling party 4.11 if the message is not deliverable or is delayed due to the inability to immediately access the called party. In this manner the ping server 6.5 can supply the appropriate feedback to the calling party 4.11 during the receiving and sending of the ping message 6.3 to the called party 6.7.

Figure 7:
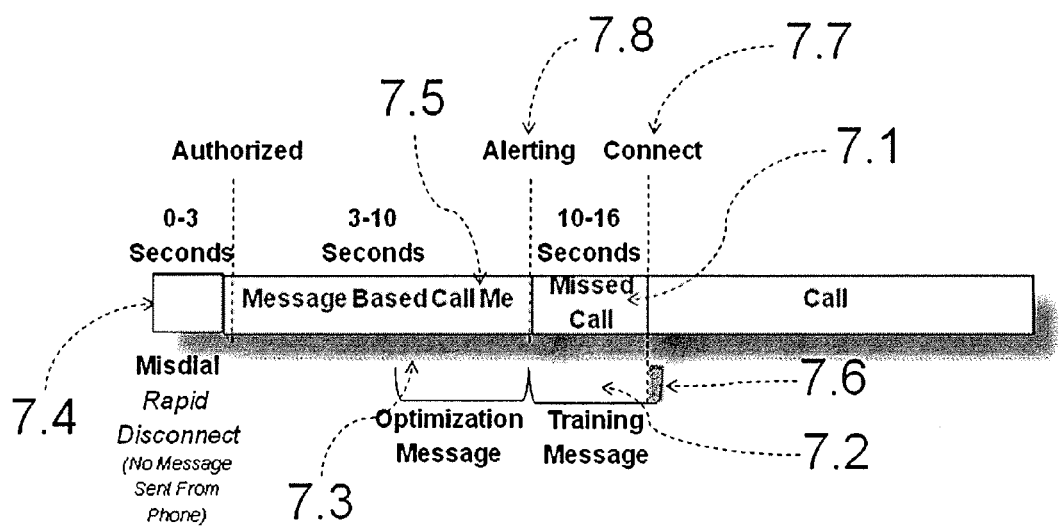
FIG. 7 is an illustration of a training or optimization message used to modify user behavior.

Turning now to FIG. 7, a sequence and example timing for determining if a message based missed call alert 7.1 is sent by the system (not shown) or if an alternative message type should be sent by the system. In one example flow the system detects the calling party (not shown) has progressed the call attempt to the point where it could be reasonably assumed the called party (not shown) would have received a missed call alert (7.1) on their phone (not shown). If this scenario occurred, the system could make the determination to trigger a training message 7.2 to the calling party. This training message can be designed to help modify the behavior of the calling party to provide an incentive to modify their behavior in the future to trigger a message based call me 7.5 in place of a missed call alert 7.1. In some implementations, the training message 7.2 is also designed to be triggered if the call attempt is actually connected 7.6. This training message 7.2 after connection 7.6, should be particularly effective since the system will detect the calling party attempted a call set up and abandoned the call set up shortly after the call connection 7.7 was received 7.6 and the calling party received a charge for the attempt to leave a missed call alert 7.8.

In some implementations, the system can also be configured to provide an optimization message 7.3. The optimization message 7.3 can be sent if the user triggered a message based call me 7.5 that had a set up length beyond a predetermined threshold. The message based call me 7.5 can be used to motivate the calling party to shorten the hold time to trigger a message based call me 7.5 and thus reduce the channel time and other resource utilization on the mobile network.

In some implementations, the call set up message also includes a misdial threshold 7.4 that can allow the calling party to rapidly abandon the call attempt in order to not send a message based call me or a missed call alert to the called party. In some implementations, the misdial threshold 7.4 can be provided by the mobile phone or the system.

One skilled in the art, when considering this disclosure, can determine how the functionality illustrated in the figures and described in the disclosure can be readily performed by the other platform or elements in the described network, be incorporated into existing platforms in the network (such as the existing prepaid SCP), be incorporated into new platforms, the functions can be combined into a single platform, the functions can be separated into multiple additional platforms, the functions can be separated in different grouping than illustrated herein, or other similar implementations without impacting the overall intent or functionality of the invention disclosed. One skilled in the art, when considering this disclosure, can also determine how this service can be applied to other architectures (such as WiMax, IMS, CDMA, or WiFi). In view of the foregoing, it can be seen that the present invention allows a mobile subscriber to easily issue a ping or call back request and have the request delivered to another user while reducing the impact to both the severing and the called networks. It can also be seen how this disclosure improves on prior art in providing the necessary safeguards and systems for easily providing the stated service in the existing network.

Other modifications, features, and embodiments of the present invention will become evident to those of skill in the art. It should be appreciated, therefore, that many aspects of the present invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A method comprising:
   monitoring, at a monitoring device, a signaling link between a mobile switching center and a service control point in a telecommunications network;
   detecting, on the signaling link by the monitoring device, a connection request comprising a called address and a caller address;
   detecting, on the signaling link by the monitoring device, a disconnection request comprising the called address and the caller address;
   determining, at the monitoring device, that a first time period between the detection of the connection request and the detection of the disconnection request is greater than a predetermined time period and greater than a second predetermined time period that is greater than the predetermined time period;
   determining content of a training message based on the determining that the first time period is greater than the predetermined time period and greater than the second predetermined time period; and
   responsive to determining that the first time period is greater than the predetermined time period and greater than the second predetermined time period, transmitting the training message to the caller address.

2. The method of claim 1, wherein the content of the training message comprises instructions requesting that a user shorten a second time period between a next connection request and a next disconnection request sent to a same called address.

3. The method of claim 1, wherein the predetermined time period corresponds to a time period for establishing a telephony call between the caller address and the called address.

4. The method of claim 1, wherein the predetermined time period corresponds to a time period that is shorter than a time period for establishing a telephony call between the caller address and the called address.

5. The method of claim 1, wherein the second predetermined time period corresponds to a time period for establishing a telephony call between the caller address and the called address.

6. The method of claim 1, wherein the training message is transmitted as a short message service message.

7. The method of claim 1, further comprising:
detecting, on the signaling link by the monitoring device, a second connection request comprising the called address and the caller address;
detecting, on the signaling link by the monitoring device, a second disconnection request comprising the called address and the caller address; and
determining, at the monitoring device, that a second time period between the detection of the second connection request and the detection of the second disconnection request is less than a predetermined time period.

8. The method of claim 7, further comprising, responsive to determining that the second time period is less than the predetermined time period, transmitting a callback request message to the called address.

9. The method of claim 1, wherein determining that the first time period is greater than the second predetermined time period comprises determining that a telephony call has been connected between the caller address and the called address.

10. A system comprising:
a link monitor configured to:
monitor a signaling link between a mobile switching center and a service control point in a telecommunications network;
detect, on the signaling link, a connection request comprising a called address and a caller address;
detect, on the signaling link, a disconnection request comprising the called address and the caller address;
determine that a first time period between the detection of the connection request and the detection of the disconnection request is greater than a predetermined time period and greater than a second predetermined time period that is greater than the predetermined time period;
determine content of a training message based on the determining that the first time period is greater than the predetermined time period and greater than the second predetermined time period; and
responsive to determining that the first time period is greater than the predetermined time period and greater than the second predetermined time period, transmit the training message to the caller address.

11. The system of claim 10, wherein the content of the training message comprises instructions requesting that a user shorten a second time period between a next connection request and a next disconnection request sent to a same called address.

12. The system of claim 10, wherein the predetermined time period corresponds to a time period for establishing a telephony call between the caller address and the called address.

13. The system of claim 10, wherein the predetermined time period corresponds to a time period that is shorter than a time period for establishing a telephony call between the caller address and the called address.

14. The system of claim 10, wherein the second predetermined time period corresponds to a time period for establishing a telephony call between the caller address and the called address.

15. The system of claim 10, wherein the training message is transmitted as a short message service message.

16. The system of claim 10, wherein the link monitor is further configured to:
detect, on the signaling link, a second connection request comprising the called address and the caller address;
detect, on the signaling link, a second disconnection request comprising the called address and the caller address; and
determine that a second time period between the detection of the second connection request and the detection of the second disconnection request is less than a predetermined time period.

17. The system of claim 16, wherein the link monitor is further configured to, responsive to determining that the second time period is less than the predetermined time period, transmit a callback request message to the called address.

18. The system of claim 10, wherein the link monitor configured to determine that the first time period is greater than the second predetermined time period comprises determining that a telephony call has been connected between the caller address and the called address.

19. The system of claim 10 where the link monitor is further configured to transmit a notification message to the called address responsive to determining that the first time period is greater than the predetermined time period.

20. The system of claim 19 where content of the notification message comprises a request to place a call to the caller address.

* * * * *